(12) United States Patent
Hua et al.

(10) Patent No.: US 11,959,243 B2
(45) Date of Patent: Apr. 16, 2024

(54) METHOD FOR CONSTRUCTING LARGE-SPAN STATION WITH TWO-WING OPEN TYPE HALF-COVER EXCAVATION AND HALF-REVERSE CONSTRUCTION

(71) Applicants: Beijing Urban Construction Design&Development Group Co., Limited, Beijing (CN); Fucai Hua, Beijing (CN); Gang Lei, Beijing (CN); Zhihui Yang, Beijing (CN); Jianye Zhu, Beijing (CN)

(72) Inventors: Fucai Hua, Beijing (CN); Gang Lei, Beijing (CN); Zhihui Yang, Beijing (CN); Jianye Zhu, Beijing (CN); Liang Zhang, Beijing (CN); Ning Li, Beijing (CN); Yanan Dong, Beijing (CN); Ningning Li, Beijing (CN)

(73) Assignees: Beijing Urban Construction Design & Development Group Co., Limited, Beijing (CN); Fucai Hua, Beijing (CN); Gang Lei, Beijing (CN); Zhihui Yang, Beijing (CN); Jianye Zhu, Beijing (CN)

( * ) Notice: Subject to any disclaimer, the term of this patent is extended or adjusted under 35 U.S.C. 154(b) by 0 days.

(21) Appl. No.: 18/357,174

(22) Filed: Jul. 24, 2023

(65) Prior Publication Data
US 2024/0076848 A1    Mar. 7, 2024

(30) Foreign Application Priority Data
Sep. 6, 2022    (CN) .......................... 202211083153.8

(51) Int. Cl.
    *E02D 29/05*      (2006.01)
    *E02D 15/04*      (2006.01)
    *E02D 17/04*      (2006.01)

(52) U.S. Cl.
    CPC ............. *E02D 29/05* (2013.01); *E02D 15/04* (2013.01); *E02D 17/04* (2013.01)

(58) Field of Classification Search
    CPC ......... E02D 29/05; E02D 15/04; E02D 17/04; E02D 17/02
    See application file for complete search history.

(56) References Cited

U.S. PATENT DOCUMENTS

| | | |
|---|---|---|
| 6,922,950 B2 | 8/2005 | Heierli |
| 7,441,990 B2 | 10/2008 | Chiaves |
| 10,508,404 B2 | 12/2019 | Dewind et al. |

FOREIGN PATENT DOCUMENTS

| | | | | |
|---|---|---|---|---|
| CN | 108643231 A | * | 10/2018 | ............. E02D 17/04 |
| CN | 109469068 A | * | 3/2019 | |

(Continued)

*Primary Examiner* — Kyle Armstrong
(74) *Attorney, Agent, or Firm* — True Shepherd LLC; Andrew C. Cheng (57) ABSTRACT

A method for constructing a large-span station by two-wing open type semi-covered excavation and semi-reverse construction, is divided into three stages of excavation. First, excavate a first-stage inner small foundation pit, then excavate a second-stage annular foundation pit within the first-stage retaining piles and outside the range of the first-stage inner small foundation pit, and finally excavate a third-stage semi-covered excavation foundation pit below the first-stage inner small foundation pit and the second-stage annular foundation pit. By setting graded retaining piles, middle upright post piles, middle top plates, local waist beams and local concrete supports in the soil-rock combination strata, so that the force transfer between the foundation pit enclosure and the station main body structures and the underlying rock layer is clear and reliable, and a stable frame structure is achieved.

10 Claims, 10 Drawing Sheets (56) References Cited

FOREIGN PATENT DOCUMENTS

| | | | | |
|---|---|---|---|---|
| CN | 111139870 A | * | 5/2020 | ........... E02D 29/055 |
| CN | 111749275 A | | 10/2020 | |
| CN | 213682122 U | | 7/2021 | |
| CN | 113565133 A | | 10/2021 | |
| CN | 113737810 A | * | 12/2021 | |

* cited by examiner

METHOD FOR CONSTRUCTING LARGE-SPAN STATION WITH TWO-WING OPEN TYPE HALF-COVER EXCAVATION AND HALF-REVERSE CONSTRUCTION

CROSS-REFERENCE TO RELATED APPLICATIONS

This application claims priority to Chinese Patent Application No. 202211083153.8 with a filing date of Sep. 6, 2022. The content of the aforementioned application, including any intervening amendments thereto, is incorporated herein by reference.

TECHNICAL FIELD

The present disclosure relates to the technical field of underground engineering, in particular to a method for constructing a large-span station by two-wing open type semi-covered excavation and semi-reverse construction, especially relates to a method for constructing a large-span station by two-wing open type semi-covered excavation and semi-reverse construction applied in soil-rock combination strata.

BACKGROUND

With the increasing density of urban rail transit meshwork, subway, as an important component of urban transportation mode, is playing an increasingly positive role in passenger transportation in population-intensive cities. In order to better share the pressure of passenger transport, the subway is usually located in the downtown areas with urban traffic and densely populated. For some of the busiest stations in the city with the largest passenger volume, the span is usually larger than that of ordinary subway stations in order to reduce the density of passenger flow and facilitate long-term transfer. Therefore, in this case, the selection of construction methods for subway station becomes particularly important. Currently, the commonly used construction methods include an open excavation method, a shallow-buried tunneling method, a covered excavation method, and the like. These methods have their own advantages and disadvantages. The open excavation method is relatively safe and low in cost, but it inevitably damages the pavement and cause huge traffic pressure. Although the shallow-buried tunneling method does not damage the road traffic, but it is expensive and has great construction risk for large-span stations. The traditional covered excavation method is a good choice for the construction of subway stations in downtown areas, but it is not allowed to reserve too many shafts on the cover plates, and the excavated earthwork can only be transported horizontally after the top plates are closed, which has a long construction period and high cost.

Therefore, in view of the above-mentioned defects, the inventors of the disclosure develop a method for constructing a large-span station by two-wing open type semi-covered excavation and semi-reverse construction through painstaking research and design and integrating the experience and achievements of relevant industries for many years, so as to overcome the above-mentioned defects.

SUMMARY

The objective of the disclosure is to provide a method for constructing a large-span station by two-wing open type semi-covered excavation and semi-reverse construction, which can effectively overcome the defects of the prior art, can quickly restore the pavement and relieve the urban traffic pressure, and can avoid the construction risk of the shallow-buried tunneling method and the difficulty of slag removal of the traditional covered excavation method, thereby improving the construction efficiency, reducing the construction risk and save the construction costs.

In order to achieve the above objective, the disclosure discloses a method for constructing a large-span station by two-wing open type semi-covered excavation and semi-reverse construction, comprising the following steps:

Step 1: a site is leveled and retaining piles are constructed for enclosing an inner small foundation pit;

Step 2: middle upright post piles of a station are constructed, and the construction of the middle upright post piles is divided into two parts: constructing pile foundations and constructing steel pipe posts;

Step 3: an earthwork of a first-stage inner small foundation pit is excavated downward in sequence to a designed elevation, a mesh is hung, a layer of concrete is sprayed to seal a surrounding rock, the steel purlins are erected as waist beams, and prestressed anchor cables are installed for enclosing the foundation pit;

Step 4: when constructing reaches a designed elevation below top plates, the top plates within the range of the middle first-stage inner small foundation pit are constructed, and top longitudinal beams are excavated with cutting;

Step 5: primary retaining piles are constructed for a second-stage annular foundation pit;

Step 6: the retaining piles of the first-stage inner small foundation pit are removed and the second-stage annular foundation pit is excavated;

Step 7: local concrete waist beams are constructed on the primary retaining piles of the second-stage annular foundation pit, and local concrete supports are constructed between the local concrete waist beams and the middle top plates;

Step 8: cantilever retaining walls are installed on the upper parts of the top plates, the middle of the retaining walls are backfilled with soil, and temporary road traffic is restored, thus the construction of semi-covered excavation cover plates with two-wing open is completed;

Step 9: an earthwork of a third-stage semi-covered excavation foundation pit is excavated from top to bottom from two wings, excavating along with supporting; the support measures above the elevation range of the soil rock interface are the primary retaining piles, prestressed anchor cables are installed, a steel mesh is hung, and then shotcrete panels are constructed;

Step 10: a foundation pit acceptance is carried out when excavating reaches 300 mm above a cushion layer of the foundation pit, and the accumulated water in the pit is drained, and then a waterproof layer of a bottom plate, a cushion layer, and the bottom plate are constructed;

Step 11: a waterproof layer is laid on a side wall, and a second lining of the side wall and a middle plate are constructed from bottom to top;

Step 12: the temporary concrete supports are removed and the construction of the top plates on both sides is completed;

Step 13: the cantilever retaining walls above the top plates are removed, a waterproof layer is laid on the top plates, soil is backfilled, and the pavement is restored.

In step 1, while the construction of the retaining piles has been completed, the height of the steel reinforcement cages exposed to the designed elevation of the top of the piles is not less than 30d.

In step 2, the differential settlement requirements between the middle upright post piles and between the middle upright post piles and the cast-in-situ bored piles are as follows: the cumulative settlement at the top of the posts is ≤20 mm, the differential settlement is ≤15 mm, and the differential settlement of adjacent piles is ≤10 mm.

In which, the construction process of the middle upright post piles is as follows:

Step 2.1: preparations of construction is ready, setting out is carried out, the positions of the piles are determined, holes is drilled and clean;

Step 2.2: the steel reinforcement cages and steel sleeves are lifted and placed integrally, and the concrete is poured into the pile foundation to the predetermined position for the first time;

Step 2.3: positioners are installed, and bolts are anchored and positioned, so that the center of cross plates of the positioners is coincided with the center of the measured piles;

Step 2.4: the concrete is poured into the pile foundation for the second time to anchor the cross plates of the positioners; when the concrete pouring is completed and the concrete reaches final setting, watering the concrete for curing; the steel pipe posts is lifted when the concrete strength reaches 25 Mpa after about 20 hours;

Step 2.5: steel pipe posts are installed, and the finished steel pipes is transported directly to a construction site for installation;

Step 2.6: the concrete is poured into the cup mouths of the pile foundations to the designed elevation of the top of the pile foundations to form the pile foundations;

Step 2.7: the concrete of C50 is poured into the steel pipe posts, so as to form the middle upright posts through the pile foundations and the steel pipe posts;

Step 2.8: the upper steel sleeves is retrieved and dry sand is backfilled around the steel pipe posts.

In step 3, anchor holes are reserved at the positions where the prestressed anchor cables pass through the steel purlins, PVC pipes with a diameter of 50 mm are used, and the steel purlins of the anchor cables are made of two pieces of I-25b composite steel.

In step 5, while the construction of the cast-in-situ bored piles has been completed, the height of the steel reinforcement cages exposed to the designed elevation of the top of the piles is not less than 30d, and the pouring elevation is 500 mm higher than the designed elevation.

In which, the second-stage annular foundation pit and the third-stage semi-covered excavation foundation pit are supported by graded suspended leg piles, and the primary retaining piles are cast-in-situ bored piles, with a rock-socketed depth being not less than 3.5 m for strong weathering, 2.5 m for moderate weathering, and 1.5 m for slight weathering; the second enclosure shotcrete-bolt supports adopt shotcrete-bolt supports and rock anchor rods are installed.

In step 7, the axes of the local concrete supports are aligned with the axes of the pile foundations and the steel pipe posts, the spacing between supports is the same as that between the pile foundations and the steel pipe posts, thus the internal support system of the second-stage annular foundation pit and the third-stage semi-covered excavation foundation pit is formed by the local concrete supports and the top plates together.

In step 8, clay and sandy soil are used as backfill materials.

In which, firstly, 500 mm thick cohesive soil is backfilled on the top plates, and filling is compacted in layers, and the thickness of each layer is between 250-300 mm during rolling; the test compactness of the filling layer under the pavement is 0.95; the backfill material for the top plates should be waterproof and back-filled at the same time, and the backfill materials within 500 mm above the top plates must be manually backfilled with clay and compacted.

It can be seen from the above content that the method for constructing a large-span station by two-wing open type semi-covered excavation and semi-reverse construction of the invention has the following effects:

1. Especially, it can be applied to the construction of large-span subway stations under the condition of soil-rock combination strata, which can effectively ensure the construction safety of large-span stations, reduce the interruption time of the road traffic, relieve the road traffic pressure, and reduce the project costs as much as possible and improve the construction efficiency.

2. Compared with the traditional covered-excavation and reverse-construction method, the two wings being open and covered-excavation in the middle part is beneficial to slag discharging, apparatus lifting in and out and so on, which can reduce the construction costs and improve the construction efficiency. Only the top plates reverse construction, the upright post piles reverse construction and other structural sequential constructions can provide a better construction environment, improve the quality of structural engineering, reduce the joint construction of vertical components such as side walls and internal load-bearing walls and so on, avoid the difficulty of continuous connection treatment, and improve the waterproof effect.

3. By setting the graded retaining piles, the middle upright post piles, the middle top plates, the local waist beams and the local concrete supports in the soil-rock combination strata, the force transmission between the foundation pit supports and the station main body structures and the underlying rock layer is clear and reliable. A stable frame structure is realized. The problems of the uneven settlement of the top plates and middle upright posts, the sliding and overturning etc. of the retaining piles are avoided, and the safety of the foundation pit is enabled. Compared with the traditional covered-excavation and reverse-construction method, it has the advantages of good construction environment, low risk, fast progress, low costs, less conversion, high quality of structure and waterproof and so on.

The details of the invention can be obtained from the following description and the attached drawings.

APPENDED DRAWING REFERENCE SIGNS

11—first-stage inner small foundation pit, 12—second-stage annular foundation pit, 13—third-stage semi-covered excavation foundation pit, 21—retaining pile, 22—prestressed anchor cable, 23—backfill materials, 24—pile foundation, 25—cantilever retaining wall, 26—local concrete support, 27—primary retaining pile, 28—rock anchor rod, 29—second enclosure shotcrete-bolt support, 31—top plate, 32—steel pipe post, 33—bottom plate, 34—middle plate, 35—side wall, 41—steel sleeve, 42—positioner cross plate, 43—positioning anchor bolt.

DETAILED DESCRIPTION OF THE EMBODIMENTS

Figure 1:
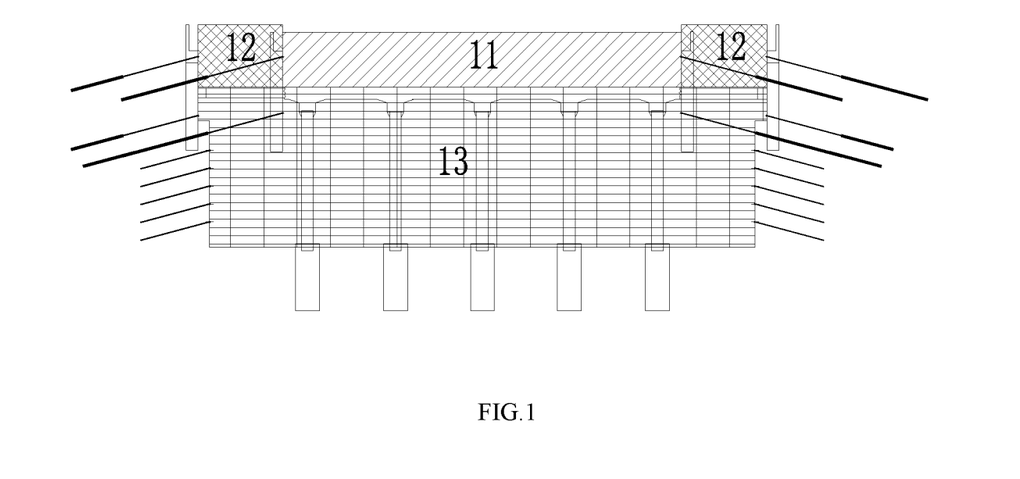
FIG. 1 shows a schematic diagram of a three-stage foundation pit according to a method for constructing a large-span station by two-wing open type semi-covered excavation and semi-reverse construction of the disclosure.

With reference to FIG. 1 to FIG. 9, a method for constructing a large-span station by two-wing open type semi-covered excavation and semi-reverse construction according to the invention is shown. Preferably, the excavation is implemented in three stages. As shown in FIG. 1, a first-stage inner small foundation pit 11 is excavated first; then a second-stage annular foundation pit 12 within primary retaining piles 27 and beyond the first-stage inner small foundation pit is excavated; and finally a third-stage semi-covered excavation foundation pit 13 below the first-stage inner small foundation pit and the second-stage annular foundation pit is excavated.

Figure 2:
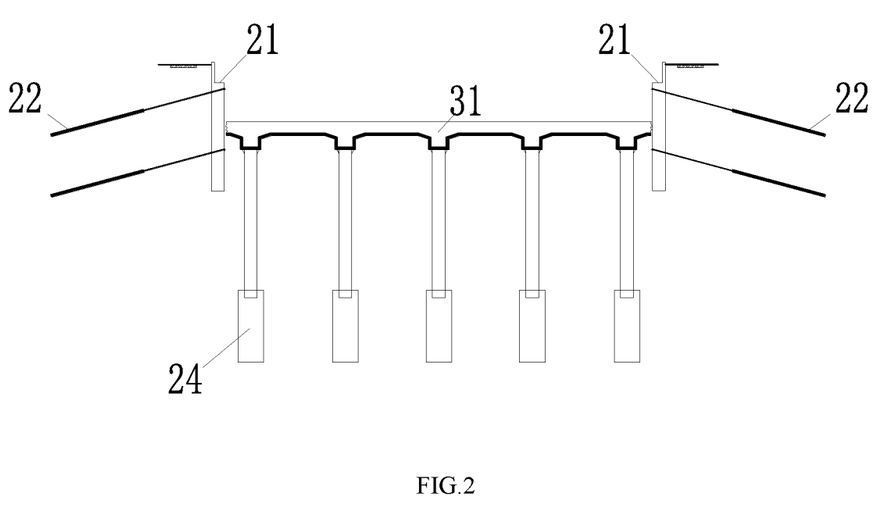
FIG. 2 shows a schematic diagram of a reverse construction of the middle upright posts and the middle top plates of the first-stage inner small foundation pit excavation of the disclosure.

The method for constructing a large-span station by two-wing open type semi-covered excavation and semi-reverse construction of the invention employs the following technical solution:

Step 1: With reference to FIG. 2, a site is leveled and retaining piles 21 for enclosing a first-stage inner small foundation pit 11 are constructed first. While the construction of the retaining piles 21 has been completed, the height of the steel reinforcement cages exposed the designed elevation of the top of the piles is not less than 30d (30 times the diameter of the steel reinforcement). Preferably, considering that the concrete pouring at the pile heads is difficult to compact, the pouring elevation should be 500 mm higher than a designed elevation, excess parts are chiseled out before the construction of the crown beams, and then reliable retaining measures are taken for the soil outside the foundation pit to ensure traffic safety. Residues, surface dust and accumulated water on the top of the piles are cleaned, and the top of the piles shall be roughened and cleaned to the designed elevation. The steel reinforcements of the crown beams shall be constructed, and the concrete crown beams shall be poured by formwork.

Step 2: middle upright post piles of the station are constructed. During the construction, the differential settlement between the middle upright post piles and between the middle upright post piles and the cast-in-situ bored piles should be strictly controlled and the cumulative settlement at the top of the posts is ≤20 mm, the differential settlement is ≤15 mm, and the differential settlement of adjacent piles is ≤10 mm.

Figure 3A:
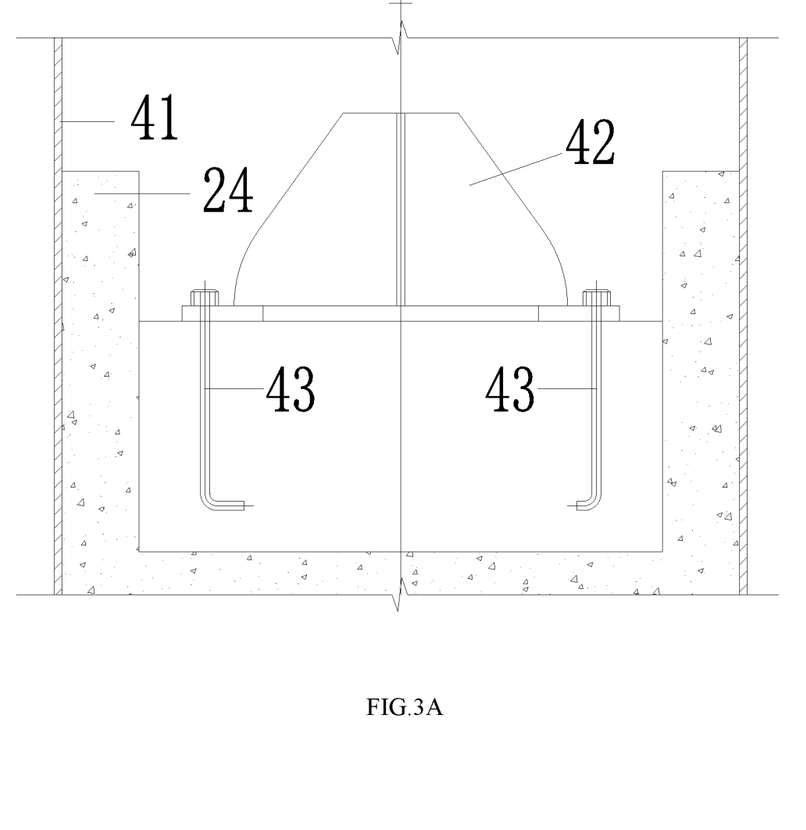
FIG. 3A shows a schematic diagram of the positioning and installation of the steel pipe posts of the disclosure.
Figure 3B:
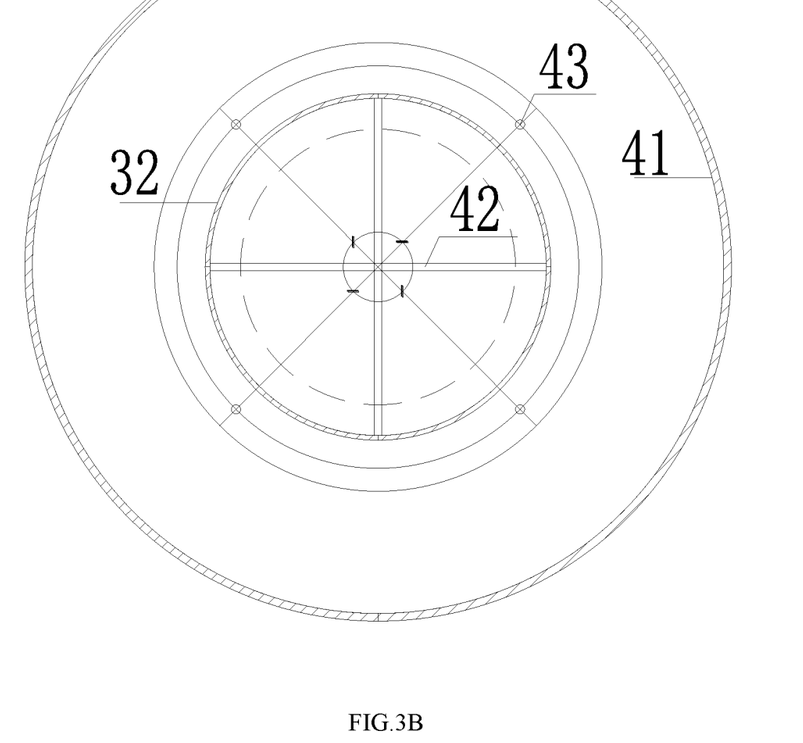
FIG. 3B shows a plane position relationship diagram of the positioner of the disclosure.
Figure 4:
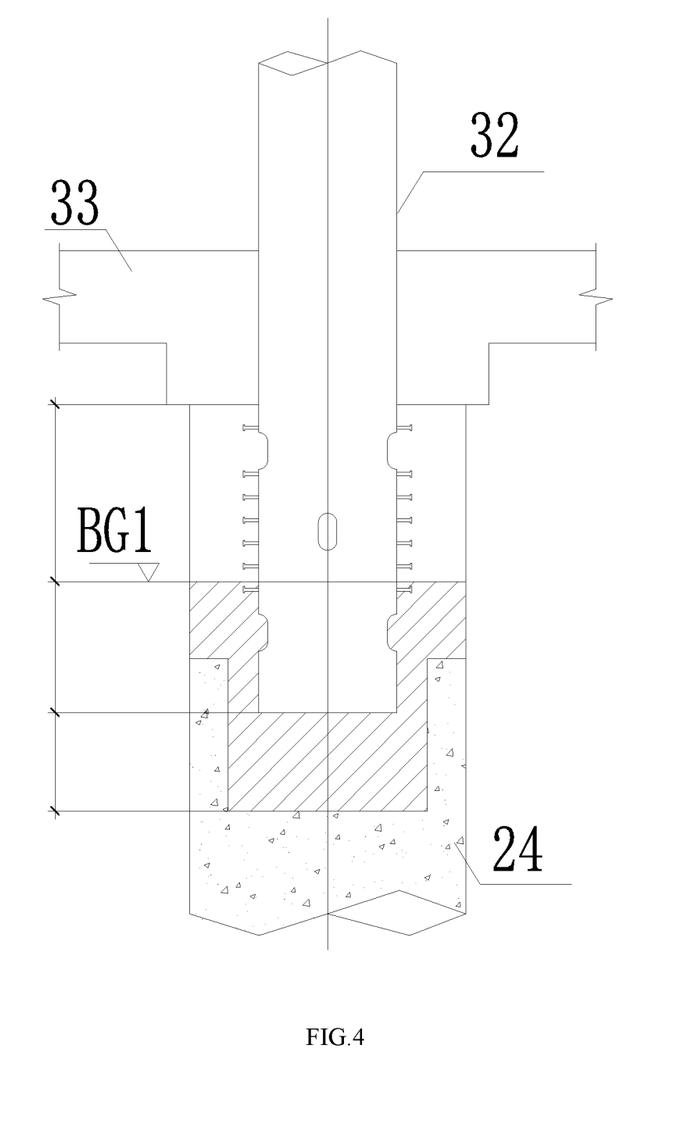
FIG. 4 shows a schematic diagram of the connection between the pile foundation of the middle upright post piles and the steel pipe posts of the invention.

Referring to FIG. 3A, FIG. 3B and FIG. 4, in step 2, the construction of the middle upright post piles is divided into two parts: constructing pile foundations 24 and constructing steel pipe posts 32. The specific construction process of the middle upright post pile is as follows:

Step 2.1: preparations of construction are ready, setting out is carried out, the positions of the piles are determined, holes are drilled and cleaned.

Step 2.2: the steel reinforcement cages and steel sleeves 41 are lifted and placed integrally, and the concrete is poured into the pile foundation to the predetermined position BG1 for the first time, generally to at least 1500 mm below the top elevation of the pile foundations. In which, after pouring concrete, a slurry pump is used to pump and drain the slurry in the excavated piles in time and the concrete (the hatched part of the oblique line in FIG. 3A within the range of L1 and L2) on the surface of the pile foundations is removed. It should be carried out in time after the initial setting of the first pouring concrete, as the concrete strength is low at this time, which is beneficial to construction.

Step 2.3: positioners are installed, preferably within L2 range (i.e., within the range of concrete chiseling on pile foundations). After the pile foundation concrete chiseling is completed, the pile heads are clean and the positioner support steel plates are installed below. Then the elevation control point is projected on the bored pile retaining wall at the wellhead again, and the top elevation of the positioner support steel plates (and the bottom elevation of the positioner bottom plates) is accurately determined by using a hanging steel ruler. Finally, the positioner is lifted to the bottom of the piles by a crane and placed on the support steel plates of the positioners. The pile center is projected on the top surface of the pile head of the pile foundation by a point projector, and the positioner cross plate 42 is moved according to the measured position of the pile center, so that the center hole of the positioner cross plate 42 coincides with the measured pile center. Then, the positioning anchor bolts 43 are anchored into concrete of the pile foundation, and the positioning anchor bolts 43 are fastened to ensure that the center hole of the positioner cross plate 42 coincides with the pile center during the subsequent construction process without displacement.

Step 2.4: the concrete is poured into the pile foundation for the second time to anchor the positioners. In order to shorten the construction period, ensure that the positioner cross plate 42 can be firmly anchored in the pile foundation concrete, and avoid deformation and displacement during the lifting of the steel pipe posts 32, C40 early strength concrete can be used to anchor the positioner cross plate 42. In view of the fast setting time and small demand of C40 early strength concrete, concrete can be mixed on site by a concrete mixer. The concrete is lifted into the bottom of the piles from the wellhead with a hopper, and is poured and vibrated manually. After pouring, the concrete residues on the positioners are cleaned with a rag to avoid affecting the positioning accuracy. When the concrete pouring is completed and the concrete reaches final setting, the concrete is watered for curing; the steel pipe posts 32 can be lifted when the concrete strength reaches 25 Mpa after about 20 hours.

Step 2.5: the steel pipe posts 32 are installed. The finished steel pipes can be transported directly to the construction site and can be installed after welding and ultrasonic nondestructive testing. During lifting, the center of the post should be aligned with the intersection line, and at the same time, two theodolites are used to measure the perpendicularity on the cross intersection axis.

Step 2.6: the concrete is poured into the cup mouths of the pile foundations to the design top elevation of the top of the pile foundations to form the pile foundations, preferably within the range of L1 and L3. The concrete grade is the same as that of the steel pipe posts 32, and the concrete of C50 is used.

Step 2.7: the concrete of C50 is poured into steel pipe posts 32 to the design position, so as to form the middle upright posts through the pile foundations and the steel pipe posts 32 together.

Step 2.8: the upper steel sleeves are retrieved and the dry sand is backfilled around the steel pipe posts 32.

Step 3: an earthwork of the first-stage inner small foundation pit is excavated downward in sequence to the designed elevation, a mesh is hung, a layer of concrete is sprayed to seal the surrounding rock, the steel purlins are erected as waist beams, and the prestressed anchor cables 22 are installed for enclosing the foundation pit.

In step 3, the anchor holes are reserved at the positions where the prestressed anchor cables 22 pass through the steel purlins, PVC pipes with a diameter of 50 mm are used. The steel purlins of the anchor cables are made of two pieces of I-25b composite steel, and all welds are continuously fully welded. The production and installation of steel purlins must ensure their stability, strength, and deformation requirements, and prevent collisions during construction.

Step 4: when constructing reaches to the designed elevation below the top plates, top plates 31 within the range of the middle first-stage inner small foundation pit are constructed, cutting and excavating, and the top longitudinal beams are constructed.

Figure 5:
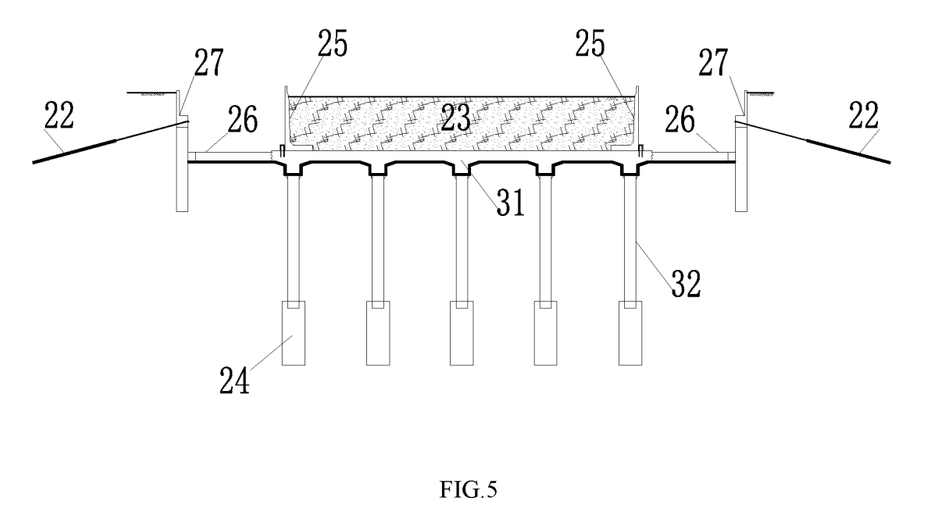
FIG. 5 shows a schematic diagram of the excavation of the second-stage annular foundation pit and the construction of the local supports to restore the temporary pavement of the disclosure.

Step 5: referring to FIG. 5, the primary retaining piles 27 are constructed for a second-stage annular foundation pit. While the construction of the cast-in-situ bored piles has been completed, the height of the steel reinforcement cages exposed to the designed elevation of the top of the piles is not less than 30d, and the pouring elevation should be 500 mm higher than the designed elevation. The excess parts should be chiseled out before the construction of the crown beams.

In step 5, considering the high hardness, high stiffness, and good self-stability of the underlying granite in the soil-rock combination strata, it is difficult and unnecessary to install cast-in-situ bored piles for the primary retaining piles. Therefore, the second-stage annular foundation pit and the third-stage semi-covered excavation foundation pit are supported by graded suspended leg piles. The primary retaining piles are cast-in-situ bored piles, with a rock-socketed depth being not less than 3.5 m for strong weathering, 2.5 m for moderate weathering, and 1.5 m for slight weathering. The second enclosure shotcrete-bolt supports 29 adopt spray anchor support, and rock anchor bolts 28 are installed.

Step 6: the retaining piles 21 of the first-stage inner small foundation pit are removed and the second-stage annular foundation pit 12 is excavated, and at this time, the whole foundation pit is excavated to the elevation of the top plates.

Step 7: the local concrete waist beams are constructed on the primary retaining piles of the second-stage annular foundation pit, and the local concrete supports 26 are constructed between the local concrete waist beams and the middle top plates. Preferably, the axes of the local concrete supports 26 are aligned with the axes of the pile foundations 24 and the steel pipe posts 32, and the spacing between the supports is the same as that between the pile foundations 24 and the steel pipe posts 32, thus the internal support system of the second-stage annular foundation pit and the third-stage semi-covered excavation foundation pit is formed by the local concrete supports and the top plates together, which belongs to the reverse-construction method. Force transmission is formed by the concrete supports through the waist beams and the primary retaining piles of the outer foundation pit, so as to form a uniform and clear force system, to prevent local stress concentration and damage, which can effectively improve the support effect.

Step 8: the cantilever retaining walls 25 are installed on the upper parts of the top plates. A reliable connection should be set between the cantilever retaining walls 25 and the middle top plates 31 to prevent the retaining walls from slipping and overturning. The middle of the retaining walls are backfilled with soil 23, temporary road traffic is restored, thus the construction of semi-covered excavation cover plates with two-wing open is completed.

In Step 8, the backfill materials 23 should be clay and sandy soil, and should not contain organic matter such as grass, garbage and the like. First, cohesive soil with a thickness of 500 mm (impervious to water) is backfilled on the top plates, and filling is compacted in layers, and the thickness of each layer is between 250-300 mm during rolling. The test compactness of filling layer under pavement is 0.95. The backfill materials of the top plates should be waterproof and back-filled at the same time, and temperature difference cracks caused by long-term exposure should be avoided. The backfill materials within 500 mm above the top plates should be manually backfilled with clay and compacted. After restoring the temporary pavement, vehicles should slow down and the speed limit is 15 km/h when they passing through covered-excavated roads.

Figure 6:
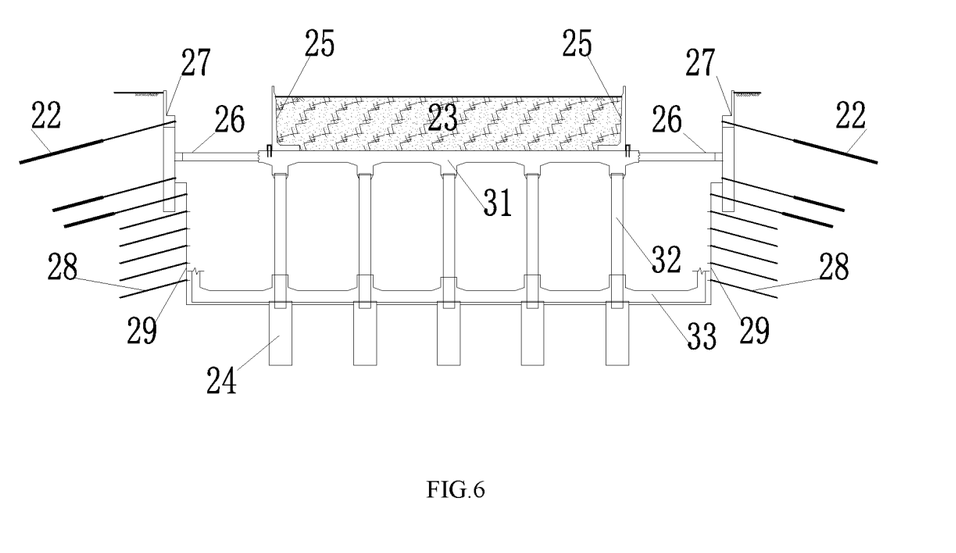
FIG. 6 shows a schematic diagram of the excavation of the third-stage semi-covered excavation foundation pit and the sequence construction of the bottom plates of the disclosure.

Step 9: an earthwork of a third-stage semi-covered excavation foundation pit is excavated from top to bottom from two wings (bottom of the second-stage annular foundation pit), excavating along with supporting. The support measures above the elevation range of the soil rock interface is the primary retaining piles 27, and a prestressed anchor cables 22 are installed, and below the elevation range of the soil-rock interface, a second enclosure shotcrete-bolt supports 29 are used. The excavation of earthwork adopts controlled smooth blasting or presplitting controlled blasting excavation technology to reduce the impact on the top plates and middle upright post piles. To minimize the impact of blasting construction on the top plates and middle upright post piles, the maximum blasting vibration speed is generally controlled within 2 cm/s. Immediately after excavation, a layer of concrete is spayed to seal the surrounding rock, and then install rock anchor bolts 28 are installed, a steel mesh is hung, and shotcrete panels are constructed. A staggered platform of more than 1000 mm should be formed between the second and primary retaining surface layers to ensure the stability and reliability of the primary retaining piles 27 embedded into the rock end.

Step 10: the foundation pit acceptance is carried out when excavating reaches 300 mm above the cushion layer of the foundation pit, and the remaining earthwork should be excavated manually. After excavating reaches the designed elevation, the foundation pit is leveled immediately, the accumulated water in the pit is drained, and then a waterproof layer of a bottom plate and a cushion layer are constructed in time, and a bottom plate 33 are constructed.

Figure 7:
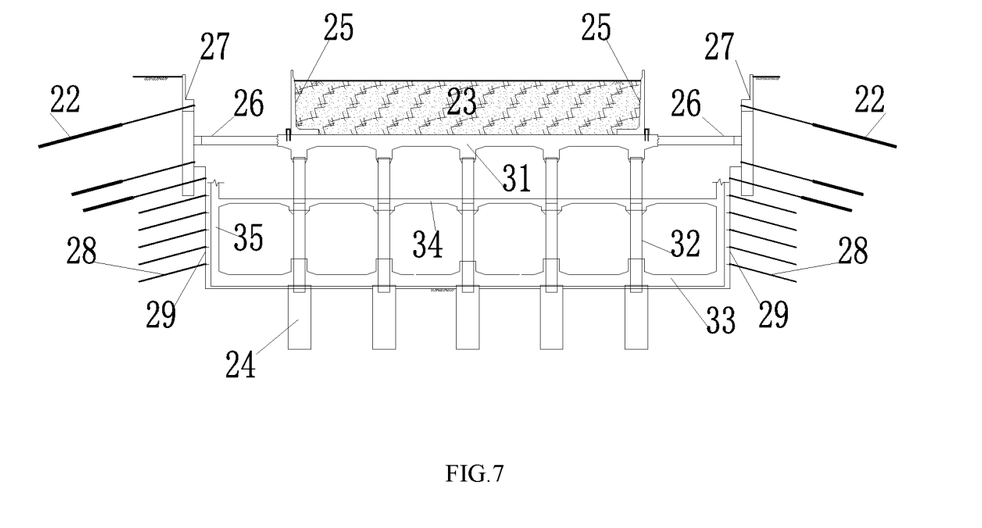
FIG. 7 shows a schematic diagram of sequence constructions of the side wall and the middle plates of the disclosure.

Step 11: a waterproof layer is laid on the side wall, and a second lining of a side wall 35 and a middle plate 34 are constructed from bottom to top.

Figure 8:
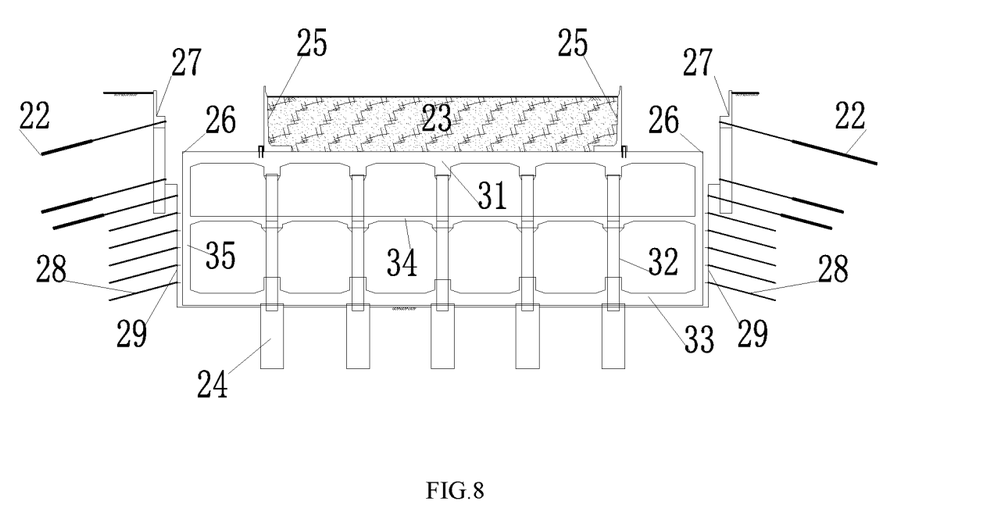
FIG. 8 shows a schematic diagram of the completion of the main body structures of the disclosure.

Step 12: the temporary concrete supports 26 are removed and the construction of the top plates 31 on both sides is completed.

Figure 9:
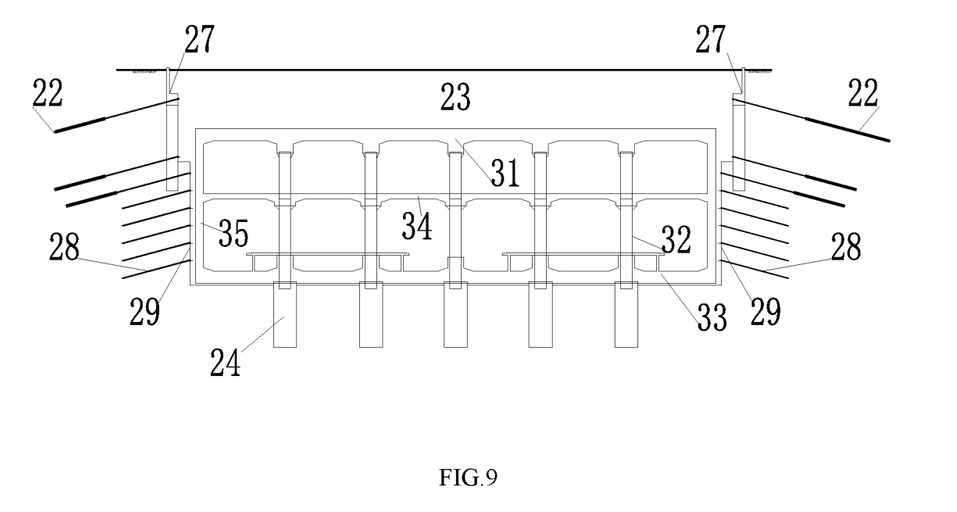
FIG. 9 shows a schematic diagram of restoring the permanent pavement after backfilling of the disclosure.

Step 13: the cantilever retaining walls 25 above the top plates are removed, a waterproof layer is laid on the top plates, the soil 23 is backfilled, and the pavement is restored.

In which, the disclosure focuses on the following aspects:

1) Constructing the Middle Upright Post Piles

The middle upright post piles enter the slightly weathered rocks, which can provide stable and reliable support for the top plates. Under the protection of the upright post piles and the top plates, excavation can be carried out to the elevation of the bottom of the pit to achieve the sequential construction of the main body structures such as the bottom plates and the middle plates of the side wall and so on, which is a prerequisite for achieving the semi-reverse construction method with only the top plates inverse. During the construction of middle upright post piles, special attention should be paid to positioning of post piles to prevent eccentricity of load-bearing posts and pile foundations, and differential settlement between piles should also be controlled.

2) Constructing the Local Waist Beams and Local Supports

Before the construction of the local waist beams and local concrete supports, interaction relationship between the middle top plates and the outer foundation pit is not established. After the local waist beams and the local concrete supports are constructed, the outer foundation pit, the middle top plates, and the middle upright post piles form a complete force frame system. The water and soil pressure on the retaining piles is transferred from the waist beams to the supports and top plates, thereby restraining the deformation of the retaining piles and ensuring the safety of the foundation pit. This design method of combining the supporting structures with the main body structures belongs to the category of reverse construction method.

3) Second Retaining of the Rock Slope

Because of the limitation of geological conditions, this construction method mainly uses rock strata and soil-rock combination strata. For this type of geology, the rock conditions are good, the surrounding rock structure is stable, and the requirements for supports are low, using spray anchor flexible supports can ensure the safety of the foundation pit, and no extra internal support system is needed. Therefore, after reverse construction of the top plates and achieving the semi-covered excavation with two-wing open, the main body structures can be constructed in sequence after excavating and supporting to the elevation of the bottom of the foundation pit, and main body structures such as the middle plates are not needed as support to ensure the safety of the foundation pit.

It is obvious that the above descriptions and records are only examples and not intended to limit the disclosure, application, or use of the disclosure. Although the embodiments have been described in the embodiments and illustrated in the accompanying drawings, the present disclosure is not limited to specific embodiments described in the accompanying drawings and embodiments and as currently considered the best mode to implement the teachings of the present disclosure. The scope of the present disclosure will include any embodiments that fall within the preceding specifications and accompanying claims.

What is claimed is:

1. A method for constructing a large-span station by two-wing open type semi-covered excavation and semi-reverse construction, comprising the following steps:

step 1: leveling a site and constructing retaining piles for enclosing an inner small foundation pit;

step 2: constructing middle upright post piles of the station, which is divided into two parts: constructing pile foundations and constructing steel pipe posts;

step 3: excavating an earthwork of a first-stage inner small foundation pit downward in sequence to a designed elevation, hanging a mesh, spray a layer of concrete to seal a surrounding rock, erecting steel purlins as waist beams, and installing prestressed anchor cables for enclosing the foundation pit;

step 4: when the construction reaching to the designed elevation below top plates, constructing the top plates within the range of the middle first-stage inner small foundation pit, cutting and excavating, and constructing top longitudinal beams;

step 5: constructing primary retaining piles for a second-stage annular foundation pit;

step 6: removing the retaining piles of the first-stage inner small foundation pit and excavating the second-stage annular foundation pit;

step 7: constructing local concrete waist beams on the primary retaining piles of the second-stage annular foundation pit, and constructing local concrete supports between the local concrete waist beams and the middle top plates;

step 8: installing cantilever retaining walls on the upper parts of the top plates, backfilling the middle of retaining walls with soil, restoring temporary road traffic, thus completing the construction of semi-covered excavation cover plates with two-wing open;

step 9: excavating an earthwork of a third-stage semi-covered excavation foundation pit from top to bottom from two wings, excavating along with supporting; the support measures above the elevation range of the soil rock interface being the primary retaining piles, installing prestressed anchor cables, hanging a steel mesh, and then constructing shotcrete panels;

step 10: carrying out a foundation pit acceptance when excavating reaches 300 mm above a cushion layer of the foundation pit, and draining the accumulated water in the pit, and constructing a waterproof layer of a bottom plate, a cushion layer, and a bottom plate;

step 11: laying a waterproof layer on a side wall, and constructing a second lining of the side wall and a middle plate from bottom to top;

step 12: removing the temporary concrete supports and completing the construction of the top plates on both sides;

step 13: removing the cantilever retaining walls above the top plates, laying a waterproof layer on the top plates, backfilling with soil, and restoring the pavement.

2. The method according to claim 1, wherein while construction of the retaining piles has been completed in step 1, the height of the steel reinforcement cages exposed the designed elevation of the top of the piles is not less than 30 times the diameter of the steel reinforcements.

3. The method according to claim 1, wherein the differential settlement requirements between the middle upright post piles and between the middle upright post piles and the cast-in-situ bored piles in step 2 are as follows: the cumulative settlement at the top of the posts is $\leq 20$ mm, the differential settlement is $\leq 15$ mm, and the differential settlement of adjacent piles is $\leq 10$ mm.

4. The method according to claim 1, wherein construction process of the middle upright post piles is as follows:

step 2.1: construction preparation, setting out, determining the positions of the piles, drilling and cleaning holes;

step 2.2: lifting and placing the steel reinforcement cages and steel sleeves integrally, and pouring concrete into the pile foundation to the predetermined position for the first time;

step 2.3: installing positioners and anchoring positioning bolts, so as to the center of cross plates of the positioners being coincided with the center of the measured piles;

step 2.4: pouring concrete into the pile foundation for the second time to anchor the positioners; when concrete pouring is completed and the concrete reaches final setting, watering the concrete for curing; lifting the steel pipe posts when the concrete strength reaches 25 Mpa after about 20 hours;

step 2.5: installing the steel pipe posts, and transporting the finished steel pipes directly to a construction site for installation;

step 2.6: pouring concrete into the cup mouths of the pile foundations to the designed elevation of the top of the pile foundation to form the pile foundations;

step 2.7: pouring concrete of C50 into the steel pipe posts, so as to form the middle upright posts through the pile foundations and the steel pipe posts;

step 2.8: retrieving the upper steel sleeves and backfilling dry sand around the steel pipe posts.

5. The method according to claim 1, wherein anchor holes in step 3 are reserved at the positions where the prestressed anchor cables pass through the steel purlins, PVC pipes with a diameter of 50 mm are used, and the steel purlins of the anchor cables are made of two pieces of I-25b composite steel.

6. The method according to claim 1, wherein in step 5 the primary retaining piles are cast-in-situ bored piles; while construction of the cast-in-situ bored piles has been completed, the height of the steel reinforcement cages exposed to the designed elevation of the top of the piles is not less than 30 times the diameter of the steel reinforcements, and the pouring elevation is 500 mm higher than the designed elevation.

7. The method according to claim 1, wherein the second-stage annular foundation pit and the third-stage semi-covered excavation foundation pit are supported by graded suspended leg piles, and the primary retaining piles are cast-in-situ bored piles, with a rock-socketed depth being not less than 3.5 m for strong weathering, 2.5 m for moderate weathering, and 1.5 m for slight weathering; the second enclosure shotcrete-bolt supports adopt shotcrete-bolt supports and rock anchor rods are installed.

8. The method according to claim 1, wherein, in step 7, the axes of the local concrete supports are aligned with the axes of the pile foundations and the steel pipe posts, the spacing between supports is the same as that between pile foundations and the steel pipe posts, thus the internal support system of the second-stage annular foundation pit and the third-stage semi-covered excavation foundation pit is formed by the local concrete supports and the top plates together.

9. The method according to claim 1, wherein clay and sandy soil are used as backfill materials in step 8.

10. The method according to claim 9, wherein, firstly, 500 mm thick cohesive soil is backfilled on the top plates, and filling is compacted in layers, and the thickness of each layer is between 250-300 mm during rolling; the test compactness of the filling layer under the pavement is 0.95; the backfill material for the top plates should be waterproof and backfilled at the same time, and the backfill materials within 500 mm above the top plates must be manually backfilled with clay and compacted.

\* \* \* \* \*